United States Patent [19]

Sims et al.

[11] Patent Number: 4,785,404

[45] Date of Patent: Nov. 15, 1988

[54] BEATING AND PASSAGE TIME OPTIMIZATION COMPUTER NAVIGATION SYSTEM FOR SAILING VESSELS

[76] Inventors: Merrick L. Sims, 7, Ilya Avenue; Theodore E. Schilizzi, 9, Ilya Avenue, both of Bayview N.S.W. 2104, Australia

[21] Appl. No.: 733,658

[22] Filed: May 13, 1985

[30] Foreign Application Priority Data

May 18, 1984 [AU] Australia .............................. PG5049

[51] Int. Cl.$^4$ ............................................ G06F 15/50
[52] U.S. Cl. .................................. 364/443; 318/588; 114/144 E
[58] Field of Search ............... 364/443, 444, 445, 424, 364/457; 318/588; 114/144 E, 144 C

[56] References Cited

U.S. PATENT DOCUMENTS

| | | | |
|---|---|---|---|
| 3,800,128 | 3/1974 | Kurk | 364/424 |
| 3,814,910 | 6/1974 | Palmieri et al. | 364/424 |
| 3,875,388 | 4/1975 | Luten et al. | 364/424 |
| 3,881,094 | 4/1975 | Taylor et al. | 364/424 |
| 3,881,095 | 4/1975 | Taylor et al. | 364/424 |
| 4,340,936 | 7/1982 | Mounce | 364/443 |

*Primary Examiner*—Parshotam S. Lall
*Assistant Examiner*—Thomas G. Black

[57] ABSTRACT

An outboard computer system which combines the outputs from onboard course, performance and wind measuring instruments to determine a sailing vessel's instantaneous rate of progress to windward when beating. This information is then used to produce audible and/or visual signals indicating to the crew when the optimal track and sail setting for the conditions has been attained, enabling them to beat optimally under the current ambient conditions. The system is also used to control automatically the settings of each of the sailing variables: rudder, main sheet, traveller, jib sheet, etc. in order to sail the vessel optimally when beating without the intervention of the helmsman or crew. A facility is also provided for recording the instantaneous rate of progress to windward in coincidence with any other variables of interest for the purpose of post evaluation and assessment of a variety of boat related equipment and procedures. The system also provides displays relating to wind history and wind prognosis. An optimal passage time automatic navigation system for sailing vessels is also provided.

16 Claims, 5 Drawing Sheets

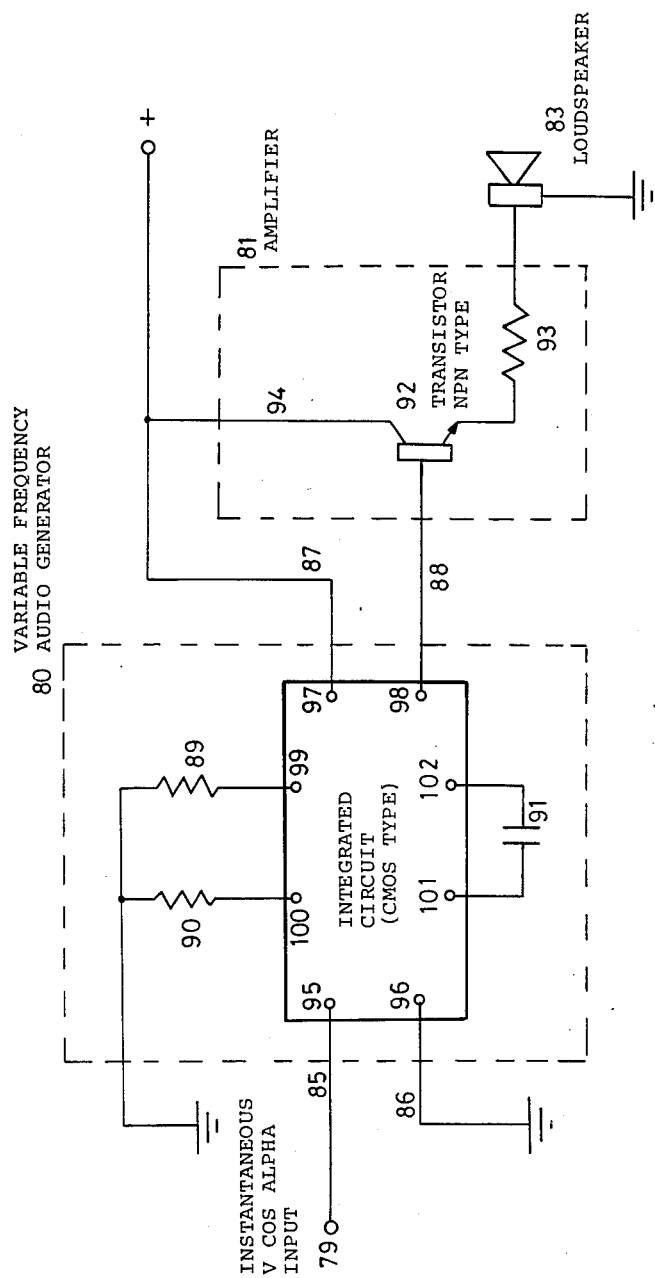

1

BEATING AND PASSAGE TIME OPTIMIZATION COMPUTER NAVIGATION SYSTEM FOR SAILING VESSELS

FIELD OF INVENTION

This invention relates to a computer system designed to enable a sailing vessel to be sailed either manually or automatically when beating, on a track which will maximise it's progress to windward under the prevailing wind and weather conditions. A variation of the system automatically navigates or permits manual navigation of sailing vessels for minimum great circle passage times.

CROSS REFERENCE TO RELATED APPLICATIONS

"IMPROVED HYDROFOIL KEEL". Filed with U.S. Patent Office 2/9/84. Inventor: Merrick Levison Sims.

DISCUSSION OF PRIOR ART

The most relevant prior art seems to be: U.S. Pat. No. 3,691,978 "APPARATUS FOR AUTOMATIC NAVIGATION OF A SAILING VESSEL". This device automatically sails vessels to required destinations using radio beacons but no provision is made for optimising progress in any direction. Also of interest is U.S. Pat. No. 3,765,362 "DYNAMIC SAIL BALANCE CONTROL", which sails yachts automatically by balancing the forces on their various sailing surfaces. Although remote radio control is provided for in this invention, the equilibrium settings ultimately depend on the intuition of the rigger, with no provision for automatic variation to cope with variability in conditions so as to optimise progress on a given direction. Power vessel autopilots such as U.S. Pat. Nos. 3,949,696 and 3,952,681 actuate the rudder only.

The art of sailing a yacht when beating is complex. At present, the balance which is struck between boat speed and boat direction, in order to optimise a vessel's progress to windward, is determined largely by the experience and intuition of the helmsman and crew. While instrumentation is available which indicates the instantaneous values of such variables as apparent wind speed, apparent wind direction, boat course, boat speed through the water, and sometimes, yaw angle, no system is currently available which processes all of this information to determine the vessel's instantaneous rate of progress to windward and offers the resulting information on a moment to moment basis for use in tracking and sailing the vessel when beating.

OBJECTS

Accordingly the present invention provides an onboard computer system for indicating to the crew of a sailing vessel the best course and sail setting to implement when beating under various and variable wind and weather conditions. This system uses a computer to combine the outputs from the conventional shipboard measuring instruments, boat speed log, compass, apparent wind speed instrument, apparent wind direction instrument, and if fitted, yaw angle meter, to produce audible and/or visual signals indicating to the helmsman and crew when the optimal course and sail setting has been attained when beating under the ambient conditions. An additional feature of the system is the use of the processed information to control automatically the settings of each of the sailing variables such as rudder position, main sheet setting, main sheet traveller position, jib sheet setting, jib sheet runner position, the cunningham, and if the keel is variable, keel position, in order to sail the vessel automatically and to optimise it's progress to windward when beating. By calling in apparently modified programs and information on the vessel's current position, the system can equally well be used to optimize the vessel's progress to leeward when running 'shy' under spinnaker and also to optimize the vessel's progress toward some given destination under great circle navigation. A data recording facility is also provided whereby instantaneous values of the vessel's progress to windward may be recorded together with any of the other variables being measured or derived by the system. This facility would be useful for post evaluation of a variety of equipment and functions, such as sail combinations, ballast ratios, gear and crew performance. The system also provides visual displays pertaining to wind history, wind prognosis, and for strategic, tactical and tacking decisions, to assist the crew when racing.

DRAWINGS

A specific embodiment of the invention will now be described with reference to the accompanying diagrams in which:

FIG. 1 is a block diagram schematically indicating the peripheral equipment required, the salient operations performed, and the sub-systems involved in implementing the computer system outlined above.

FIG. 2 is a block diagram schematically representing the equipment required to perform the operations required by the automatic beating optimiser sub-system shown as 21 in FIG. 1. This sub-system automatically adjusts and subsequently maintains, in repetitive sequence, the settings of each of the control and sailing variables, such as rudder setting, main sheet setting, etc. in order to optimise the vessel's progress to windward when beating without the intervention of the helmsman or crew. Adjustment of the settings may be made electrically, hydraulically or pneumatically. In the description of the operation of this sub-system given below means of electrical adjustment and maintenance are described. In the interest of specification brevity, means of hydraulic and pneumatic adjustment and maintenance are not fully described. However in operation they are analogous to the electrical option, and may be easily understood by substituting the words "valve" for "switch"; "pressure" for "voltage"; "hydraulic or pneumatic motor" for "electric motor"; "hydraulic or pneumatic brake" for "electric brake" etc. in the description of FIG. 2. Combinations of these options may also be used in a given application: for instance electric motors may be used with hydraulic brakes.

Figure 1:
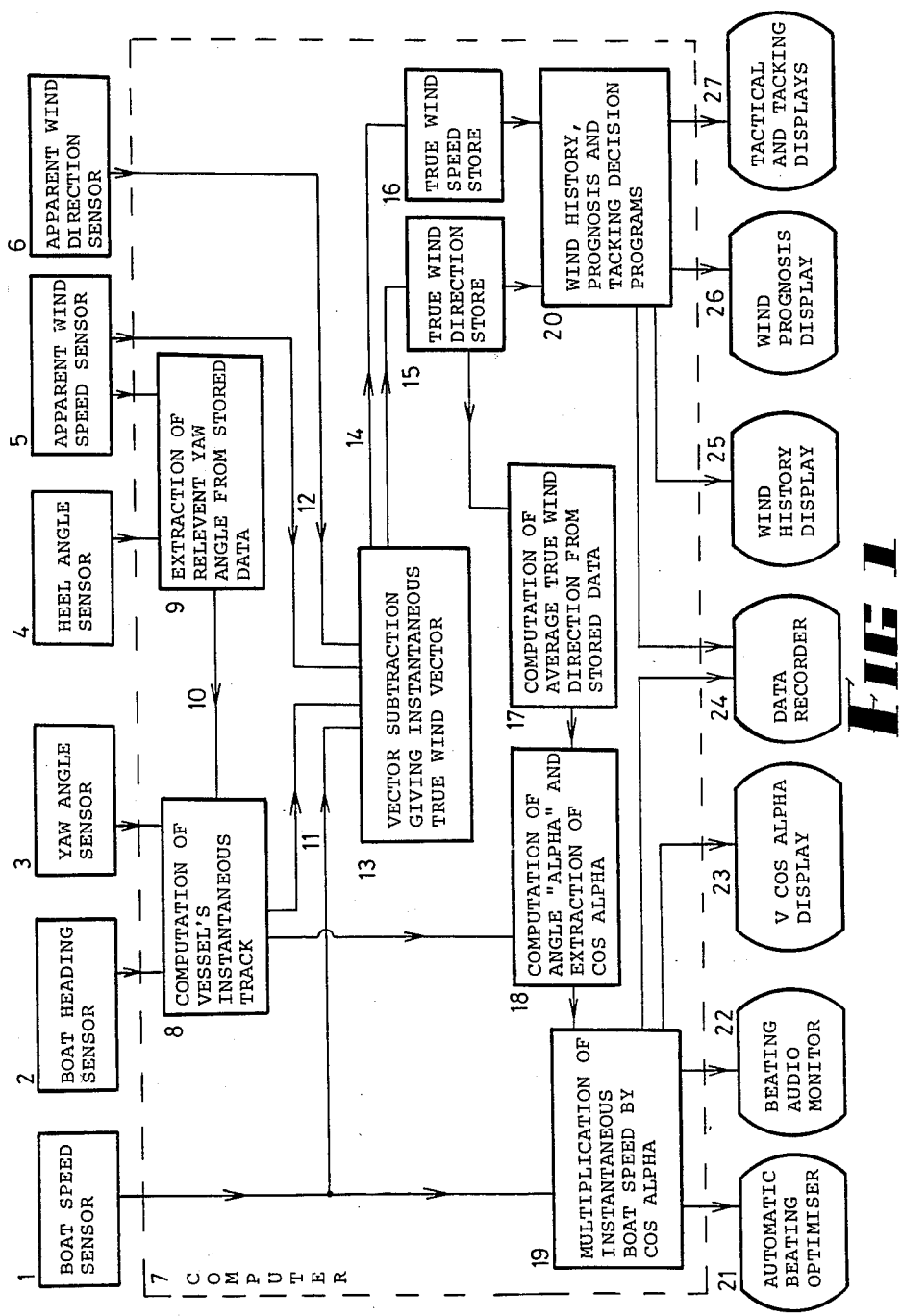
Figure 5:
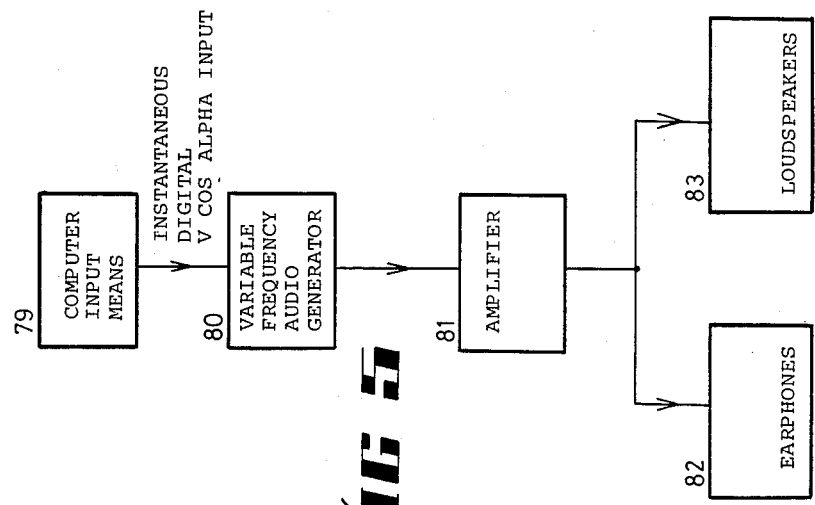

FIG. 5 is a block diagram schematically indicating the operations performed and the equipment required to implement the beating audio monitor sub-system, shown as 22 in FIG. 1. When the boat is being sailed manually, this sub-system is used to indicate to the helmsman and crew when the optimal track and sail setting has been attained for beating under the ambient conditions. This sub-system can also be implemented using equipment known in the art.

FIG. 6 shows, by way of illustration, one example of a circuit implementing the beating audio monitor subsystem of FIG. 5.

DESCRIPTION AND OPERATION

A detailed description of the system operation will now be given. In the following description of the operation of the system, reference will be made to the blocks numbered in the several figures and the relationships between them will be given.

In FIG. 1:

1. represents a boat speed measuring instrument of conventional design. This instrument would deliver continuous or time spaced measurements of the vessel's speed through the water in analogue or digital form. If the measurements were in analogue form they would be converted to digital form in an appropriate modem for use in the computer.

2. is the shipboard compass, of conventional design, delivering compass headings on the same basis as those for boat speed, indicated in 1 above.

3. is a yaw angle meter, of conventional design, delivering yaw angle measurements on the same basis as indicated in 1 above.

4. represents an inclinometer delivering measurements of the angle of heel of the vessel on the same basis as in 1 above.

5. is the apparent wind speed measuring instrument, of conventional design, delivering apparent wind speed measurements on the same basis as in 1 above.

6. is the apparent wind direction measuring instrument, of conventional design, delivering apparent wind direction measurements on the same basis as in 1 above.

7. is a dashed-line block representing the computer boundary. Operations within this block would be performed by the computer while those outside it are the functions of peripherals. The computer used may be of microcomputer size and would need to incorporate appliance switching functions to enable it to perform the operations required in FIG. 2.

8. represents the operations within the computer in which the vessel's compass course, from 2, is corrected for the yaw angle, from 3, to give it's track. Yaw angle values to correctthe compass course may be obtained in an alternative way, whereby a vessel may be pre-calibrated for yaw angle when beating into various wind strengths and at various angles of heel. (The angle of heel at a given apparent wind speed will depend on the sail combination worn at the time and the sea conditions). This yaw angle information may then be stored in a two dimensional table, according to apparent wind speed and angle of heel, for later retrieval as required by the computer. One advantage of this alternative is that a yaw angle meter does not have to be carried and maintained on the boat.

9. represents the operation by which the appropriate yaw angle is derived by the computer using information on the current apparent wind speed and angle of heel of the vessel, using the table described in 8 above. If a yaw angle meter, 3 above, were carried, operation 9 would not be carried out. The program sub-routines required for operations 8 and 9 are quite straightforward and so they are not included in this specification.

10. represents the operation of passing yaw angle values to operation 8 after their derivation in operation 9, (when operation 9 is performed).

11. The parallel lines near 11 represent the vessel's instantaneous track vector comprising the elements of it's instantaneous track, from 8, and it's instantaneous speed through the water, from 1.

12. The parallel lines near 12 represent the instantaneous apparent wind vector comprising the elements of the instantaneous apparent wind speed, from 5, and the instantaneous apparent wind direction, from 6.

13. represents a vector subtraction in which the instantaneous true wind vector is obtained by vectorially subtracting the vessel's instantaneous track vector from the instantaneous apparent wind vector.

14. The parallel lines near 14 represent the elements of the instantaneous true wind vector comprising the instantaneous true wind speed, (upper line), and the instantaneous true wind direction.

15. represents the instantaneous true wind direction matrix in which successive readings of the instantaneous true wind direction are stored for averaging over a given period of the immediate past. The number of places in this matrix is arranged to equal the product of the number of readings of the instantaneous true wind vector produced by the computer per second, (which member is variable at the will of the crew), and the time period in seconds over which the wind direction is to be averaged. This period should be long enough to eliminate short term variations in wind direction but short enough to allow longer term trends to be indentified from the averages. Obviously this period would change with the variability of the ambient conditions, however about 600 seconds would be workable for most conditions. Thus if N readings of the vector are to be made per second, the matrix would need 600N places and the $600N+1$ th reading would be placed in the first matrix place so that the true wind direction could be averaged on an ongoing basis over a given time period of the immediate past. Then, if wind conditions are reasonably continuous we can expect the progressively averaged true wind directions to closely approximate to the average true wind directions experienced over progressively similar periods of the immediate future.

16. represents the instantaneous true wind speed matrix in which successive readings of the instantaneous true wind speed are stored for averaging as is the true wind direction in the matrix of 15.

17. represents the operation of averaging the true wind direction according to the description given in 15. The instantaneously derived average values are then passed to operation 18.

18. represents the operation of determining the instantaneous angle between the instantaneously derived average true wind direction, from 17, and the vessel's instantaneous track, from 8. This angle will henceforth be referred to as "alpha". The cosine of this angle is also taken in this operation, the resulting quantity will henceforth be referred to as "cos alpha".

19. representsthe operation of multiplying the vessel's instantaneous speed through the water, from 1, by cos alpha, from 18. The resulting quantity will henceforth be referred to as "V cos alpha". V cos alpha represents the resolution of the vessel's instantaneous speed through the water in the windward direction, and so measures the vessel's progress to windward, when beating. The system is concerned with the presentation and use of V cos alpha in a variety of ways, and for this reason it is used as input to the functions numbered 21, 22, 23, and 24.

20. represents a suit of programs used by the computer to process data from the matrices 15 and 16 to produce output data for function 24 and for the displays numbered 25, 26, and 27.

Figure 2:
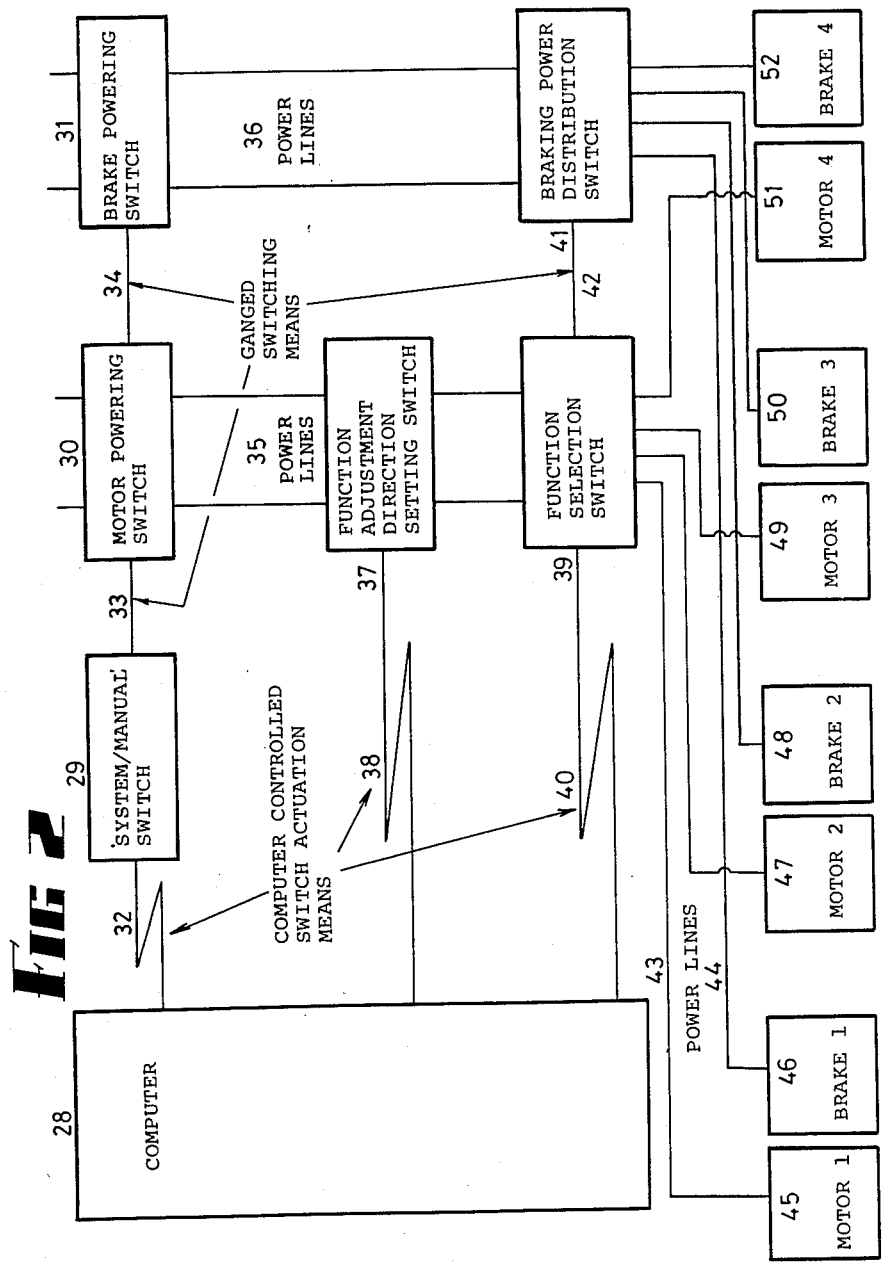

21. represents the automatic beating optimiser subsystem which is shown schematically in detail in the block diagram of FIG. 2. This subsystem controls automatically the settings of the control and sailing variables, such as, the rudder setting, the main sheet setting, the main sheet traveller position, the jib sheet runner position, the cunningham setting, etc. according to the instantaneous values of V cos alpha, so as to optimise the vessel's progress to windward when beating without the intervention of helmsman or crew. Activation of these adjustments can be made electrically, hydraulically or pneumatically.

22. represents the beating audio monitor sub-system which is shown schematically in the block diagram of FIG. 5 and as an example in FIG. 6. When the vessel is being sailed manually, this subsystem provides audible signals to the helmsman and crew of variations of the rate of progress to windward when beating, and thus allows optimum progress to windward to be achieved. In this sub-system the frequency of a Variable Audio Frequency Generator of conventional type is controlled by the magnitude of the quantity V cos alpha. The resulting variable audio frequency is indicated to the crew via headphone(s) and/or loudspeaker(s). This allows them to optimise the progress of the vessel to windward by making adjustments to maintain the generated audio tone at the highest frequency possible. By relying on an audible indication such as this, the crew's visual attention can be maintained on sailing the boat.

23. is a computer display visually representing to the crew the some variations in V cos alpha as are audibly presented in 22.

24. represents a data recorder of conventional type. By this means variations in V cos alpha may be recorded together with any of the other variables shown in the diagram, for later evaluation, analysis, and comparison.

25. is a wind history computer display visually presenting the crew with a variety of wind history data produced by the programs of 20.

26. is a wind prognosis computer display presenting the crew with relevant prognoses on wind direction and wind speed produced by the programs of 20.

27. is a computer display presenting the crew with data to assist them in making strategic, tactical and tacking decisions when racing and to optimise tracks in general navigation, produced by the programs of 20.

In FIG. 2:

28. represents the same onboard computer which performs the operations shown in

FIG. 1. It also performs the switching operations 30, 37 and 39 indicated in FIG. 2 as required by the sequence flowcharted in FIG. 3.

29. represents a manually operated 'System/Manual' switch which can be set to 'manual' by the crew if they wish to sail the vessel by hand, and to 'system' if they wish the automatic beating optimiser sub-system to control the vessel.

30. represents a switch capable of powering and depowering motors operating the adjustment of the vessel's control and sailing functions. The motors involved, shown as 45, 47, 49 and 51 in FIG. 2, would be capable of operating in both directions depending on the polarity (if D.C.) or phase (if A.C.) of the power applied to them, so that adjustment could be exercised in both directions. This switch would be linked to switch 29 so that when that switch was set to 'system' the motors would be powered.

31. represents a switch capable of powering and depowering a means of braking or locking the motors described in 30. This switch would also be linked to switch 29 so that when it was set to 'system' the locking means would be powered. This locking means must be of the type 'power on; lock on' not of the type 'power off; lock on', since the former arrangement allows the vessel to be sailed manually when the power is off, and so is fail safe.

32. represents the connection between switch 29 and the computer 28 by which the setting of 29 is communicated to the computer.

33. represents the linkage between switch 29 and switch 30 by which the setting of 29 is communicated to 30.

34. represents the linkage between switch 29 and switch 31 by which the setting of 29 is communicated to 31.

35. The parallel lines each side of 35 represent the conductors carrying power for the motors referred to in 30.

36. The parallel lines on each side of 36 represent the conductors carrying power for the braking or locking means referred to in 31.

37. represents a function adjustment direction setting switch which reverses the polarity (if D.C.) or phase (if A.C.) of the power to the motors 45, 47, 49, and 51 etc. supplied by switch 30, in order to reverse the direction of adjustment of the control or sailing functions.

Figure 3:
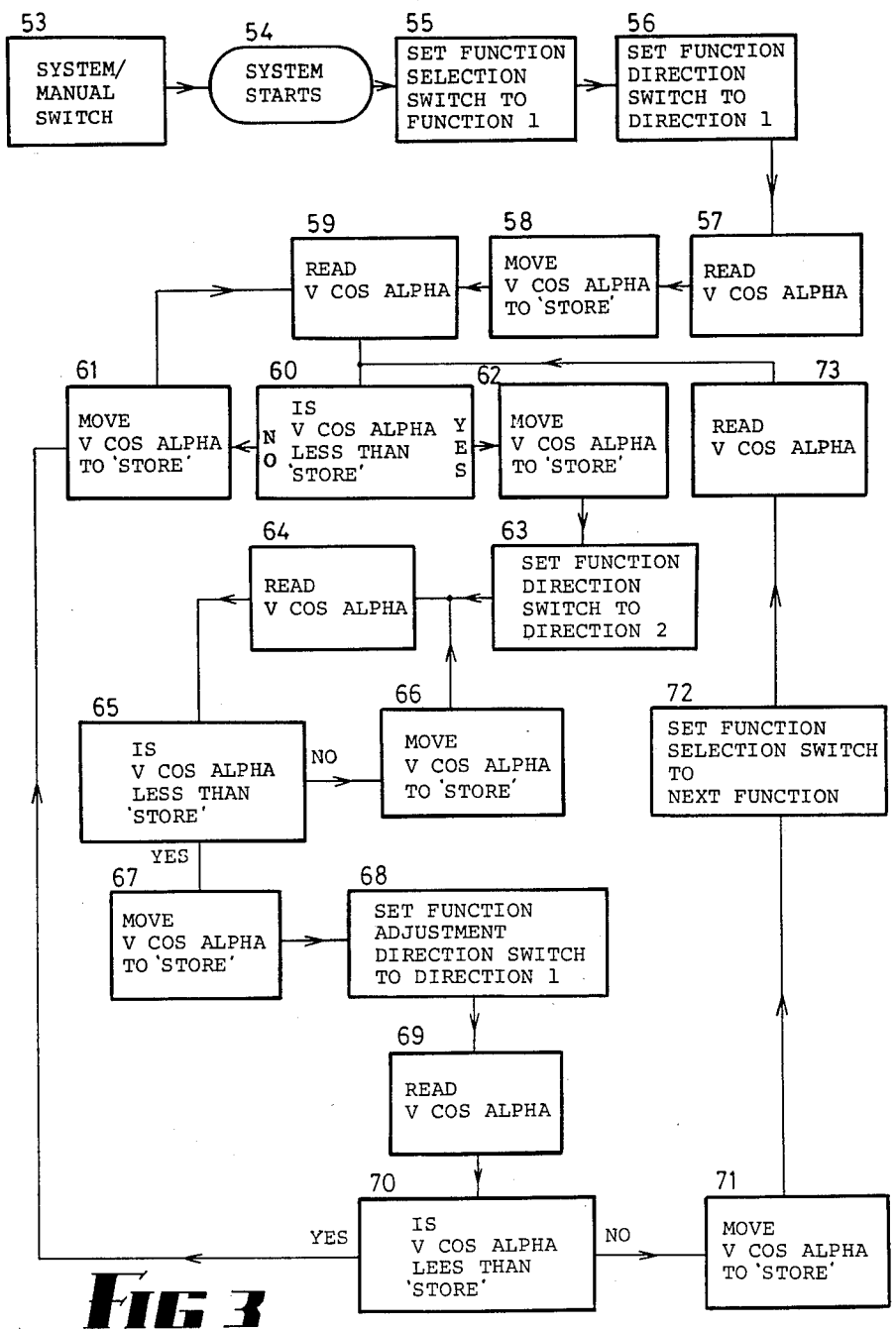
FIG. 3 is a flowchart indicating the sequence of logical, decision, and switching operations performed by the computer in controling the automatic beating optimiser sub-system shown in FIG. 2.

38. represents the connection by which switch 37 is set by the computer according to instructions 56, 63, and 68 of FIG. 3.

39. represents a function selection switch capable of passing power to each of the motors 45, 47, 49, and 51 etc. (one at a time in repetitive sequence), which motors operate the vessel's control and sailing functions as instructed by the computer in accordance with the instructions shown in the flowchart of FIG. 3. This sequence causes each of the functions to be optimally adjusted to suit the ambient conditions, in rapid repetitive sequence.

40. represents the connection through which switch 39 is set by the computer according to instructions 55 and 72 of FIG. 3.

41. represents a braking power distribution switch capable of distributing power at any one time from switch 31 to all except one of the means of braking the motors 45, 47, 49, and 51 etc. referred to in 31, in repetitive sequence, and is linked to switch 39 in such a way that when 39 is powering a given motor, 41 is powering the braking means of all of the other motors, but is depowering (freeing) the given one. Switching means known in the art may be used to implement 39 and 41. This arrangement allows any given control or sailing function to be adjusted individually to optimise V cos alpha as outlined in FIG. 3 while all other functions are held steady for later adjustment in turn on a repetitive sequential basis.

42. represents the linkage between 39 and 41 by which the setting of 39 is communicated to 41.

43. represents the electrical connection between switch 39 and the motor 45 powering the first control or sailing function.

44. represents the electrical connection between switch 41 and the braking means shown as 46 for the first control or sailing function.

45. represents the motor which actuates adjustment of the first sailing function or sailing variable. This motor must be capable of operation in both directions. To improve the mechanical advantage of the motor it may be expedient in some cases to gear the motor to the function. In such a case, it may also provide expedient to arrange a power operated clutch to disengage the function from the gear train and motor when sailing manually, in order to assure freer action. In this event it would be necessary to provide electrical connections between switch 31 and the means of powering each of the clutches, by-passing switch 41, so that when switch 31 was supplying power, all of the motors would be geared to their functions, and when the power was cut off, all of the motors would be thrown out of gear.

46. represents the means of braking or maintaining the adjustment of the first sailing function or sailing variable. This means of braking or maintenance of adjustment must be of the 'power on; brake on' type in order to be fail safe.

47 and 48. represent respectively the motive and braking means for the second sailing function, operating in the same way as 45 and 46.

49 and 50 and 51 and 52. represent the motive and braking means for the third and fourth sailing functions with as many more functions being included as a given application may require. For instance, a vessel with a variable keel would require one more control function than would a vessel with a fixed keel.

In FIG. 3:

53. represents the manually operated 'system/manual' switch 29 of FIG. 2. When the crew set this switch to the 'system' position, indicating that they wish to use the automatic beating optimiser sub-system to control the vessel, the following operations are initiated. The computer is signalled via connection 32 to begin the sequence of logical, transfer and switching operations outlined in FIG. 3, while switch 30 is set via linkage 33 to power the function motor circuit selected by switch 39, and switch 31 is set by linkage 34 to power the braking circuits selected by switch 41.

54. Under the instruction of an appropriately designed program the computer begins the sequence of FIG. 3.

55. The function selection switch 39 is set by the computer via connection 40 to adjust the setting of the first control or sailing function; say the rudder position. At the same time the braking power distribution switch 41 is set via linkage 42 to brake all motors except that for the function being adjusted.

56. The function adjustment direction setting switch 37 is then set by the computer via connection 38 so as to adjust the function in a given direction. By convention, this direction will be known as 'direction 1', and the opposite direction will be known as 'direction 2'.

57. The computer then produces the next instantaneous value of V cos alpha according to the operations outlined in FIG. 1. On computers suitable for this system, the frequency of production or "reading" of V cos alpha would be selectable at the will of the crew in the range 1000 per second to 1 per 10 seconds, so that this frequency could be manually adjusted to allow the system to react in the best way to the variability of conditions on a given day. About 20 readings per second might be sufficient for average conditions, with a higher rate for higher variability and vice versa.

58. The derived value of V cos alpha is moved into a reference or storage position, hereafter known as 'store', for comparison with a later reading.

59. The computer waits the selected time interval, allowing the motor to continue to adjust the function, and then makes the next reading of V cos alpha.

60. This latest reading of V cos alpha is then compared with the reading in 'store'. A reading less than 'store' would indicate that adjustment was in the wrong direction. If this situation occurs the sequence moves to 62, otherwise it passes to 61.

61. The latest reading of V cos alpha is moved to 'store' and the computer waits the selected time interval again, allowing the motor to continue to adjust the function, and then makes the next reading of V cos alpha. Unless this reading is less than 'store', the sequence again performs the loop 61-59-60 until a reading less than 'store' is obtained, at which time the sequence moves to 62.

62. The latest reading of V cos alpha is moved to 'store'.

63. The computer then sets the function adjustment direction setting switch 37 via connection 38, in order to now adjust the function in direction 2. We know that adjustment is now taking place in the correct direction. Now we need only identify the peak value of V cos alpha, at which point it's rate of change with respect to adjustment will become negative.

64. The computer again awaits the selected time interval and makes the next reading of V cos alpha.

65. Unless this reading is less than 'store', the sequence performs the loop 66-64-65 until a reading less than 'store' is obtained, at which time the sequence moves to 67.

66. The latest reading of V cos alpha is moved to 'store'.

67. The latest reading of V cos alpha is moved to 'store'.

Note. We now know that adjustment is less than 1 adjustment time interval past the peak value and is progressing in the wrong direction, unless conditions have changed enough to change the required position for peak value, significantly, since the last adjustment direction change.

68. The computer sets the function adjustment direction setting switch 37 to direction 1 again, in order to adjust the function in the correct direction.

69. The computer then waits the selected time interval and again reads V cos alpha. We know that this will be the maximum value unless the position for peak value has changed since the previous adjustment direction change, so we test for a change in this condition.

70. A reading of V cos alpha less than 'store' would indicate that the change in position for peak value has occurred, in which case the sequence is re-entered at 61 and adjustment is continued until a reading of V cos alpha at 69 is not lessthan 'store', in which case the sequence moves to 71.

71. The latest reading of V cos alpha is moved to 'store'.

72. The computer then sets the function selection switch 39 to adjust the next control function in sequence; say the main sheet. At the same time the braking power distribution switch 41 is set to brake all functions except that one just selected for adjustment.

73. The computer then waits the selected time interval and makes the next reding of V cos alpha, after which the sequence is re-entered at 60.

In this way, all of the control and sailing functions or variables are adjusted in repetitive sequence, in such a way as to maximize the vessel's rate of progress to windward for as long as the system/manual switch 53 is set to 'system'. Operation of this sub-system is brought to a close by manually setting switch 53 to 'manual'. Note that this sub-system will not, as it stands, automatically tack the vessel.

Tacking procedure would be: manual takeover—tack—bring vessel to beating attitude—automatic handover. Similarly, the vessel must first be brought manually to the beating attitude from a start before automatic handover. In bringing the vessel to the beating attitude, the sheets appropriate for the tack in operation, (port or starboard), would be led to their respective adjustment means via turning blocks and manually fixed to the said means before automatic handover.

If vessel inertia generates the well known "servo-lag" problem for the sub-system during adjustment, this difficulty can be overcome by the following method: after operation 68 of FIG. 3, adjustment is continued until the rate of change of V cos alpha with respect to adjustment in the given direction again becomes negative, while at the same time counting the number of adjustment iterations between operation 68 and this said change in sign. Then the function adjustment direction setting switch 37 is set to direction 2 and adjustment is continued in this new direction for half of the number of adjustment iterations observed above, before selection of the next function in sequence for adjustment.

Since the rate of adjustment of the sailing functions or variables depends on the voltage or the hydraulic pressure used in a given application, and since it is desirable to be able to vary the rate of adjustment in order to cope with the range of variabilities in ambient wind and weather conditions, hydraulic adjustment offers an advantage over electric adjustment, because hydraulic pressure can be more easily varied over a wide range than can voltage, which is limited to the maximum voltage of the batteries carried.

As explained in the expanding paragraph, and as will also be seen from claims 21 and 22, the above described sub-system can readily be adapted for a minimum passage time automatic navigation system when used in conjunction with a navigation program.

The data recording facility, to be described next, would be useful for boat, sail and gear development and evaluation as well as for crew evaluation. The novel feature claimed in this facility is the recording of the vessel's instantaneous rate of progress to windward when beating in coincidence with other relevant variables. This facility can be implemented with current equipment.

Figure 4:
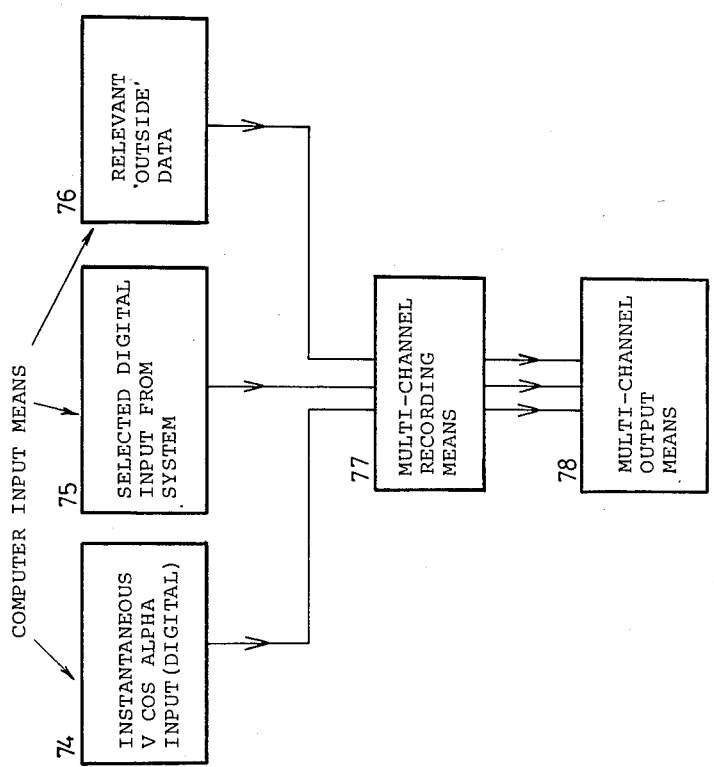
FIG. 4 is a block diagram indicating the operations performed by the data recording facility shown as 24 in FIG. 1. Equipment well known in the art can be used to implement this facility.

In FIG. 4:

74 represents the V cos alpha output from operation 19 which is used as input for the data recording facility, to be recorded in coincidence with the other relevant data on the combined data file 78.

75 represents any of the variables, other than V cos alpha, being measured or derived by the system, which for some post evaluation or assessment purpose, must be recorded together with V cos alpha. As an example: In evaluation ballast ratios it is necessary to know the values of V cos alpha at given apparent wind speeds, over the range of ratios tested. Thus the apparent wind speed would have to be recorded together with V cos alpha, for this purpose.

76. In some cases it may be necessary to record variables which are not derived or measured by the system. As an example: sea conditions such as wave height and wave length affect V cos alpha as well as does apparent wind speed. Thus it would be advantageous to be able to also enter such variables into the record. 76 represents an input device through which such "outside" data may be entered into the record together with V cos alpha. This device may take the form of a measuring instrument supplying data on the same basis as 1 in FIG. 1, or it may involve a keying operation in which the variable in question is independently measured or assessed, and the resulting values are manually keyed into the record at that time.

77 represents a multi-channel output recording means, such as a magnetic tape, disc, paper tape, etc. unit or a pen recorder, capable of outputting as many channels of information in coincidence as the system may require.

78 represents the recorded information pack. This may be removed from the vessel if necessary for use in assessment and post evaluation purposes.

The beating audio monitor sub-system to be described next is used for beating optimisation when sailing manually and it may also be used to audibly monitor the performance of the automatic system. The novel feature claimed for this sub-system is the use of audible signals representing instantaneous variations in a sailing vessel's rate of progress to windward when the vessel is beating.

In FIG. 5:

79 represents the sequence of instantaneous values of the quantity V cos alpha, which form the output of operation 19 in FIG. 1. This output from operation 19 is used as input to the beating audio monitor sub-system.

80 represents a variable frequency audio generator of conventional design, the frequency of which is determined by the values of the input quantity V cos alpha. The frequency would be arranged to increase with V cos alpha between the limits, say from 200 Hz to 3000 Hz over the range of variation of V cos alpha. Neither the actual limiting frequencies, nor the precision of the linearity of the relationship between the above quantity V cos alpha and the generated audio frequency, are critical to the operation of this device.

81 represents an amplifier of conventional design, used to amplify the varying ascillations from 80 for use in 82 and/or 83.

82 represents conventional earphones used to audibly convey the varying frequencies to the helmsman and crew.

83 represents conventional loudspeaker(s) which may be used as an alternate means of audibly conveying the varying frequencies to the helmsman and the crew.

In FIG. 6:

84 represents an integrated circuit of CMOS type; for instance type 4046.

85 represents the input line which connects the input signal 79 to the input pin 95 of 84.

86 represents the connection between earth and pin 96 of 84.

87 represents the connection between a positive source of direct current power and pin 97 of 84.

88 represents the line which connects the output variable frequency signal from pin 98 of 84 to the base of the transistor 92 which is part of the amplifier 81.

89 represents a variable resistor of about 100 k.ohms connected between earth and pin 99 of 84.

90 represents a fixed resistor of about 200 k.ohms connected between earth and pin 100 of 84.

91 represents a fixed capacitor of about 0.01 microfarad connected between pins 101 and 102 of 84.

92 represents a transistor of NPN type: for instance type 2N1613.

93 represents a fixed resistor of about 33 ohms connected between the emitter of 92 and a loudspeaker 83.

94 represents the connection between a positive source of direct current power and the collector of 92.

95 represents the input terminal of 84.

96 represents the earth terminal of 84.

97 represents the positive supply terminal of 84.

98 represents the output terminal of 84.

99, 100, 101 and 102 represent terminals of 84 which are used in this configuration.

Data for the wind history display, 25 of FIG. 1 is derived in the following way: the sequential series of instantaneous true wind directions from operation 13 are averaged as in the descriptions of operations 15 and 17 and the resulting series of averaged true wind directions are stored on a first in—first out basis, in a further storage area similar to the storage area described for operation 15. When required, a curve of best fit is mathematically fitted by the computer by means of a polynomial regression to the series of averaged values of the instantaneous true wind direction contained in the said further storage area, at that time. This curve of best fit will be a representation of the history of the true wind direction over the immediate past period covered by all of the instantaneous true wind directions who's average wind directions were contained in the further storage area, and is displayed as such. Displays of the history of the true wind speed over the same period can be obtained by applying an analogous method to the sequential series of instantaneous true wind speeds from operation 13.

Data for the wind prognosis display, 26 of FIG. 1 is derived in the following way: extrapolations from the curves of best fit derived above, are made by evaluating the equations representing these curves after substitution of the appropriate values for the independent variable, (time), to project the shapes of the said curves as far as required into the future, and these extrapolations are displayed as true wind speed and true wind direction prognoses.

While the above description contains many specifications, these should not be construed as limitations on the scope of the invention, but rather as exemplification of one preferred embodiment thereof. Many other variations are possible, for example when sailing, (and not necessarily when beating), one could resolve a sailing vessel's velocity relative to the water in any direction at all, (and not necessarily in the true windward direction), in order to optimise the vessel's progress in that direction. One use for this procedure would be for optimisation of passage times for sailing vessels, as the following example will show: consider a destination in the middle of an ocean unencumbered with land masses; a sailing vessel making for the destination could minimise it's sailing distance by staying close to the rhumb line connecting it's point of departure with the destination. However, this procedure might not minimise the vessel's passage time, which is equal to the distance along the rhumb line/the vessel's average speed along the rhumb line. A more systematic procedure would be to sail the vessel at all times so that it's speed through the water resolved in the direction along which-ever great circle happens to pass through the destination and the vessel's position at that time, is a maximum. This result would be achieved by having the system maximise the product of the vessel's instantaneous velocity relative to the water and the cosine of the instantaneous angle between the vessel's instantaneous direction of movement relative to the water and the instantaneous great circle bearing of the destination from the vessel. In this way the system will maximise the rate at which the vessel approaches the island at all times irrespective of the direction in which it has to move through the water to achieve this end, a result which the procedure of following the rhumb line does not guarantee since the latter procedure only keeps the vessel close to the shortest path and does not maximise the rate of approach. Thus, if the vessel is sailing, (beating, reaching or running), so as to maximise at all times, it's instantaneous velocity relative to the water resolved along the great circle which happens to pass through the destination and the vessel's instantaneous position, it will be minimising it's passage time to the destination. It will be seen that an embodiment of the invention in which a means of determining a vessel's position at any time is combined with a means of determining the bearing from the vessel of whichever great circle happens to pass through the vessel's position at any time and the destination, will enable a sailing vessel, when not constrained by land masses, to sail from any point to any given destination in minimum time. Under variable wind conditions, this usage of the system may result in a vessel approaching it's destination along a path which departs significantly from the rhumb line connecting it's point of departure and it's destination, even though the passage time has been minimised. Claims 21 and 22 are concerned with this usage of the system.

Accordingly, the scope of the invention should be determined not by the embodiment illustrated, but by the appended claims and their legal equivalents.

What we claim is:

1. A digital computer navigation system for use on a sailing vessel when beating, designed to maximize said vessel's rate of progress in an averaged true wind direction, said system comprising a processing means for vectorially subtracting time sequenced values of said vessel's instantaneous direction of movement relative to the water on which said vessel is sailing and time sequenced values of said vessel's instantaneous speed relative to said water, from time sequenced values of an instantaneous apparent wind direction relative to said vessel and time sequenced values of an instantaneous apparent wid speed relative to said vessel, to produce time sequenced values of an instantaneous true wind direction, a processing means for averaging said time sequenced values of an instantaneous true wind direction, to produce an averaged true wind direction, a processing means for determining time sequenced values of the cosine of an instantaneous angle between said averaged true wind direction and said vessel's instantaneous direction of movement relative to said water, a processing means for multiplying said time sequenced values of said cosine of said instantaneous angle by said time sequenced values of said vessel's instantaneous speed relative to said water, to produce time sequenced resolutions of said vessel's instantaneous velocity relative to said water in an averaged true wind direction, an audio frequency generating means for converting said time sequenced resolutions into audio frequency signals, a sound producing means for making said audio frequency signals audible;

whereby a crew of said vessel is enabled to sail it so as to continually tend toward maximization of the pitch of said audio frequency signals, whereupon said vessel's rate of progress in an averaged true wind direction tends toward maximization when said vessel is beating.

2. A system as in claim 1 wherein said time sequenced resolutions are recorded together with coincident values of the instantaneous apparent wind speed relative to said vessel and an instantaneously derived angle of heel of said vessel.

3. A system as in claim 1 wherein said vessel's instantaneous direction of movement relative to said water is obtained from an instantaneously measured value of said vessel's campass heading and an instantaneously measured value of said vessel's yaw angle, using a yaw angle meter.

4. A digital computer navigation system for use on a sailing vessel when beating, designed to automatically maximize said vessel's rate of progress in an averaged true wind direction, said system comprising, a processing means for vectorially subtracting time sequenced values of said vessel's instantaneous direction of movement relative to the water on which said vessel is sailing and time sequenced values of said vessel's instantaneous speed relative to said water, from time sequenced values of an instantaneous apparent wind direction relative to said vessel and time sequenced values of an instantaneous apparent wind speed relative to said vessel, to produce time sequenced values of an instantaneous true wind direction, a processing means for averaging said time sequenced values of an instantaneous true wind direction, to produce an averaged true wind direction, a processing means for determining time sequenced values of the cosine of an instantaneous angle between said averaged true wind direction and said vessel's instantaneous direction of movement relative to said water, a processing means for multiplying said time sequenced values of said cosine of said instantaneous angle by said time sequenced values of said vessel's instantaneous speed relative to said water, to produce time sequenced resolutions of said vessel's instantaneous velocity relative to said water in an averaged true wind direction, a processing means for determining when said time sequenced resolutions are at maximum value, a signalling means for signalling when said time sequenced resolutions are at maximum value, to, an automatic control means for controlling the adjustment, on a repetitive sequential basis, of said vessel's sailing variables, including rudder setting, main sheet setting and jib sheet setting, to continually tend toward maximization of said time sequenced resolutions, said automatic control means comprizing, a selection means for selecting one of said vessel's said sailing variables for adjustment until said time sequenced resolutions are at maximum value and for then passing selection on to the next of said sailing variables, for adjustment in turn, on a repetitive sequential basis, an adjustment means for adjusting the setting of that particular sailing variable selected for adjustment at a given time, until said time sequenced resolutions are at maximum value, a restraining means for maintaining the settings of all sailing variables not selected for adjustment at a given time;

whereby said vessel is automatically sailed so that said time sequenced resolutions tend toward maximization, whereupon said vessel's rate of progress in an averaged true wind direction automatically tends toward maximization, when said vessel is beating.

5. A system as in claim 4 designed to derive time sequenced values of an instantaneous yaw angle component of said vessel's instantaneous direction of movement relative to the surface of said water when said vessel is beating, said system comprising means for obtaining time sequenced values of said instantaneous apparent wind speed relative to said vessel, means for obtaining time sequenced values of an instantaneous angle of heel of said vessel when beating, means for accessing a two dimensional computer matrix containing measured values of said vessel's yaw angle when beating, obtained during a yaw angle calibration program conducted on said vessel over the range of apparent wind speeds which said vessel might be expected to encounter at various times and when said vessel is heeling at angles covering the range of angles at which it might be expected to heel when beating and carrying the several sail combinations which it might be expected to carry in the said apparent wind speeds, arranged in one computer matrix dimension according to relevant apparent wind speed and in the other computer matrix dimension according to relevant angle of heel;

whereby said time sequenced values of said instantaneous yaw angle component are derived using said time sequenced values of said instantaneous apparent wind speed to access first said computer matrix dimension and said time sequenced values of said instantaneous angle of heel to access second said computer matrix dimension.

6. A system as in claim 4 wherein successive values of said instantaneous true wind direction are stored in a computer matrix, the number of storage places in said computer matrix being variable and proportional to the product of the time rate of production of values of said instantaneous true wind direction and the time rate of adjustment of said vessel's sailing variables, which time rate of adjustment is variable at the will of a system operator, with placement of successive values of said instantaneous true wind direction into successive places in said computer matrix, proceeding on a 'first in-first out' basis, so that when the last place in said computer matrix has been occupied by the most recent value of said instantaneous true wind direction produced by the system, placement of the next value to be produced of said instantaneous true wind direction will be into the first storage place in said computer matrix, with subsequent said values filling subsequent said storage places, on to the last said storage place, in a repetitive sequence.

7. A system as in claim 6 wherein, after each placement of a value of said instantaneous true wind direction into said last storage place, all of said values within said computer matrix are averaged and each of the averaged values of said instantaneous true wind direction is stored in a further computer matrix on a repetitive sequential basis.

8. A system as in claim 7, designed to display historical wind direction information for a period covering said averaged values of said instantaneous true wind direction stored in said further computer matrix, said system comprising a processing means for performing polynomial regression on said averaged values of said instantaneous true wind direction stored in said further computer matrix, using time as the independent variable in said regression, to produce polynomial equations best representing said averaged values for said period, a plotting means for plotting curves representing said polynomial equations, over said period, a display means for displaying said curves;

whereby said historical wind direction information is displayed.

9. A system as in claim 8, designed to generate and to display prognoses on true wind direction covering a time increment range immediately subsequent to the time of the latest of said averaged values of said instantaneous true wind direction in said further computer matrix, said system comprising, an extrapolation means for repetitively adding increments of time to said time of said latest of said averaged values, to form a series of incremented time values covering said time increment range, and for repetitively substituting said incremented time values as an independent variable in said polynomial equations, and for repetitively calculating corresponding dependent values for said equations, over said time increment range, a plotting means for plotting curves of said corresponding dependent values against said incremented time values, over said time increment range, a display means for displaying said curves;

whereby said true wind direction prognoses are displayed.

10. A system as in claim 4 wherein said vessel's instantaneous direction of movement relative to said water is obtained from an instantaneously measured value of said vessel's compass heading and an instantaneously measured value of said vessel's yaw angle using a yaw angle meter.

11. A digital computer navigation system for use on a sailing vessel, designed to automatically minimize said vessel's great circle passage time to a destination of given position, said system comprising, a processing means for processing time sequenced values of said vessel's instantaneous position in conjunction with values of the latitude and of the longitude of said destination, to produce time sequenced values of an instantaneous great circle bearing of said destination from said vessel's instantaneous position, a processing means for processing time sequenced values of said vessel's instantaneous position, in conjunction with antecedent time sequenced values of said vessel's instantaneous position, to produce time sequenced values of said vessel's direction of movement relative to the earth's surface and time sequenced values of said vessel's speed relative to the earth's surface, a processing means for determining time sequenced values of the cosine of an instantaneous angle between said instantaneous great circle bearing and said time sequenced values of said vessel's direction of movement relative to the earth's surface, a processing means for multiplying said time sequenced values of said cosine of said instantaneous angle, by said time sequenced values of said vessel's speed relative to the earth's surface, to produce time sequenced resolutions of said vessel's instantaneous velocity relative to the earth's surface along said instantaneous great circle bearing, a processing means for determining when said time sequenced resolutions are at maximum value, a signalling means for signalling when said time sequenced resolutions are at maximum value, to, an automatic control means for controlling the adjustment, on a repetitive sequential basis, of said vessel's sailing variables, including rudder setting, main sheet setting and jib sheet setting, to continually tend toward maximization of said time sequenced resolutions, said automatic control means comprizing, a selection means for selecting one of said vessel's said sailing variables for adjustment until said timme sequenced resolutions are at maximum value and for then passing selection on to the next sailing variable for adjustment in turn, on a repetitive sequential basis, an adjustment means for adjusting the setting of that particular sailing variable selected for adjustment at a given time, until said time sequenced resolutions are at maximum value.

a restraining means for maintaining the settings of all sailing variables not selected for adjustment at a given time;

whereby said vessel's rate of progress along said instantaneous great circle bearing automatically tends toward maximization, whereupon said vessel's great circle passage time to said destination automatically tends toward minimization.

12. A system as in claim 11 wherein said adjustment means is connected through a clutch to said particular sailing variable selected for adjustment at a given time.

13. A system as in claim 11 wherein the time rate of adjustment of said vessel's said sailing variables, is variable at the will of a system operator.

14. A digital computer navigation system for use on a sailing vessel, designed to minimize said vessel's great circle passage time to a destination of given position, said system comprising, a processing means for processing time sequenced values of said vessel's instantaneous position, in conjunction with values of the latitude and of the longitude of said destination, to produce time sequenced values of an instantaneous great circle bearing of said destination from said vessel's instantaneous position, a processing means for processing time sequenced values of said vessel's instantaneus position in conjunction with antecedent time sequenced values of said vessel's instantaneous position, to produce time sequenced values of said vessel's direction of movement relative to the earth's surface and time sequenced values of said vessel's speed relative to the earth's surface, a processing means for determining time sequenced values of the cosine of an instantaneous angle between said instantaneous great circle bearing and said time sequenced values of said vessel's direction of movement relative to the earth's surface, a processing means for multiplying said time sequenced values of said cosine of said instantaneous angle by said time sequenced values of said vessel's speed relative to the earth's surface, to produce time sequenced resolutions of said vessel's velocity relative to the earth's surface along said instantaneous great circle bearing, an audio frequency generating means for converting said time sequenced resolutions into audio frequency signals, a sound producing means for making said audio frequency signals audible;

whereby a crew of said vessel is enabled to sail it so as to continually tend toward maximization of the pitch of said audio frequency signals, whereupon said vessel's great circle passage time to said destination tends toward minimization.

15. A digital computer navigation system for use on a sailing vessel when beating, designed to maximize said vessel's rate of progress in an averaged true wind direction, said system comprising, a processing means for vectorially subtracting time sequenced values of said vessel's instantaneous direction of movement relative to the water on which said vessel is sailing and time sequenced values of said vessel's instantaneous speed relative to said water, from time sequenced values of an instantaneous apparent wind direction relative to said vessel and time sequenced values of an instantaneous apparent wind speed relative to said vessel, to produce time sequenced values of an instantaneous true wind direction, a processing means for averaging said time sequenced values of an instantaneous true wind direction, to produce an averaged true wind direction, a processing means for determining time sequenced values of the cosine of an instantaneous angle between said averaged true wind direction and said vessel's instantaneous direction of movement relative to said water, a processing means for multiplying said time sequenced values of said cosine of said instantaneous angle by said time sequenced values of said vessel's instantaneous speed relative to said water, to produce time sequenced resolutions of said vessel's instantaneous velocity relative to said water in an averaged true wind direction, a computer display means for making the relative magnitudes of said time sequenced resolutions visible;

whereby a crew of said vessel is enabled to sail it so as to continually tend toward maximization of said time sequenced resolutions whereupon said vessel's rate of progress in an averaged true wind direction tends toward maximization when said vessel is beating.

16. A digital computer navigation system for use on a sailing vessel, designed to minimize said vessel's great circle passage time to a destination of given position, said system comprising, a processing means for processing time sequenced values of said vessel's instantaneous position, in conjunction with values of the latitude and of the longitude of said destination, to produce time sequenced values of an instantaneous great circle bearing of said destination from said vessel's instantaneous position, a processing means for processing time sequenced values of said vessel's instantaneous position, in conjunction with antecedent time sequenced values of said vessel's instantaneous position, to produce time sequenced values of said vessel's direction of movement relative to the earth's surface and time sequenced values of said vessel's speed relative to the earth's surface, a processing means for determining time sequenced values of the cosine of an instantaneous angle between said instantaneous great circle bearing and said time sequenced values of said vessel's direction of movement relative to the earth's surface, a processing means for multiplying said time sequenced values of said cosine of said instantaneous angle, by said time sequenced values of said vessel's speed relative to the earth's surface, to produce time sequenced resolutions of said vessel's velocity relative to the earth's surface, along said instantaneous great circle bearing, a computer display means for making the relative magnitudes of said time sequenced resolutions visible;

whereby a crew of said vessel is enabled to sail it so as to continually tend toward maximization of said time sequenced resolutions, whereupon said vessel's great circle passage time to said destination tends toward minimization.

* * * * *